United States Patent [19]
Van 'T Veer

[11] Patent Number: 5,462,383
[45] Date of Patent: Oct. 31, 1995

[54] HOUSING DEVICE FOR FITTING IN THE PAVEMENT

[75] Inventor: Pieter Van 'T Veer, The Hague, Netherlands

[73] Assignee: Zweva Holding B.V., Emst, Netherlands

[21] Appl. No.: 280,934

[22] Filed: Jul. 27, 1994

[30] Foreign Application Priority Data

Aug. 13, 1993 [EP] European Pat. Off. .............. 93202370

[51] Int. Cl.⁶ ................................ E01C 11/22; E01F 5/00
[52] U.S. Cl. .................................................................. 404/4
[58] Field of Search .................................. 404/2, 3, 4, 5, 404/25; 52/20

[56] References Cited

U.S. PATENT DOCUMENTS

| | | | |
|---|---|---|---|
| 4,345,998 | 8/1982 | Graffis et al. | 404/4 X |
| 4,621,939 | 11/1986 | Thomann et al. | 404/4 |
| 5,026,202 | 6/1991 | Thomann | 404/5 X |
| 5,061,116 | 10/1991 | Monks | 404/4 X |
| 5,181,793 | 1/1993 | Dekel | 404/4 |
| 5,281,052 | 1/1994 | Beamer | 404/4 X |

FOREIGN PATENT DOCUMENTS

| | | |
|---|---|---|
| 0310488 | 4/1989 | European Pat. Off. . |
| 2652839 | 4/1991 | France . |
| 7230526 | 11/1972 | Germany . |
| WO94/0190 | 1/1994 | WIPO . |

*Primary Examiner*—William P. Neuder
*Attorney, Agent, or Firm*—Young & Thompson

[57] ABSTRACT

A housing device intended for fitting in the pavement of a road surface, footpath and the like, such as a junction box for cables, opens out on the surface of the pavement, and has sides (2, 3) which form an interior space and bound an access opening near their top end. In order to also give the device a sufficiently great stability when made of plastic, the sides each have an inside wall (5) and an outside wall (4) which are situated a distance apart, which walls (4, 5) of one side (2, 3) in each case are interconnected by ribs (6).

13 Claims, 3 Drawing Sheets

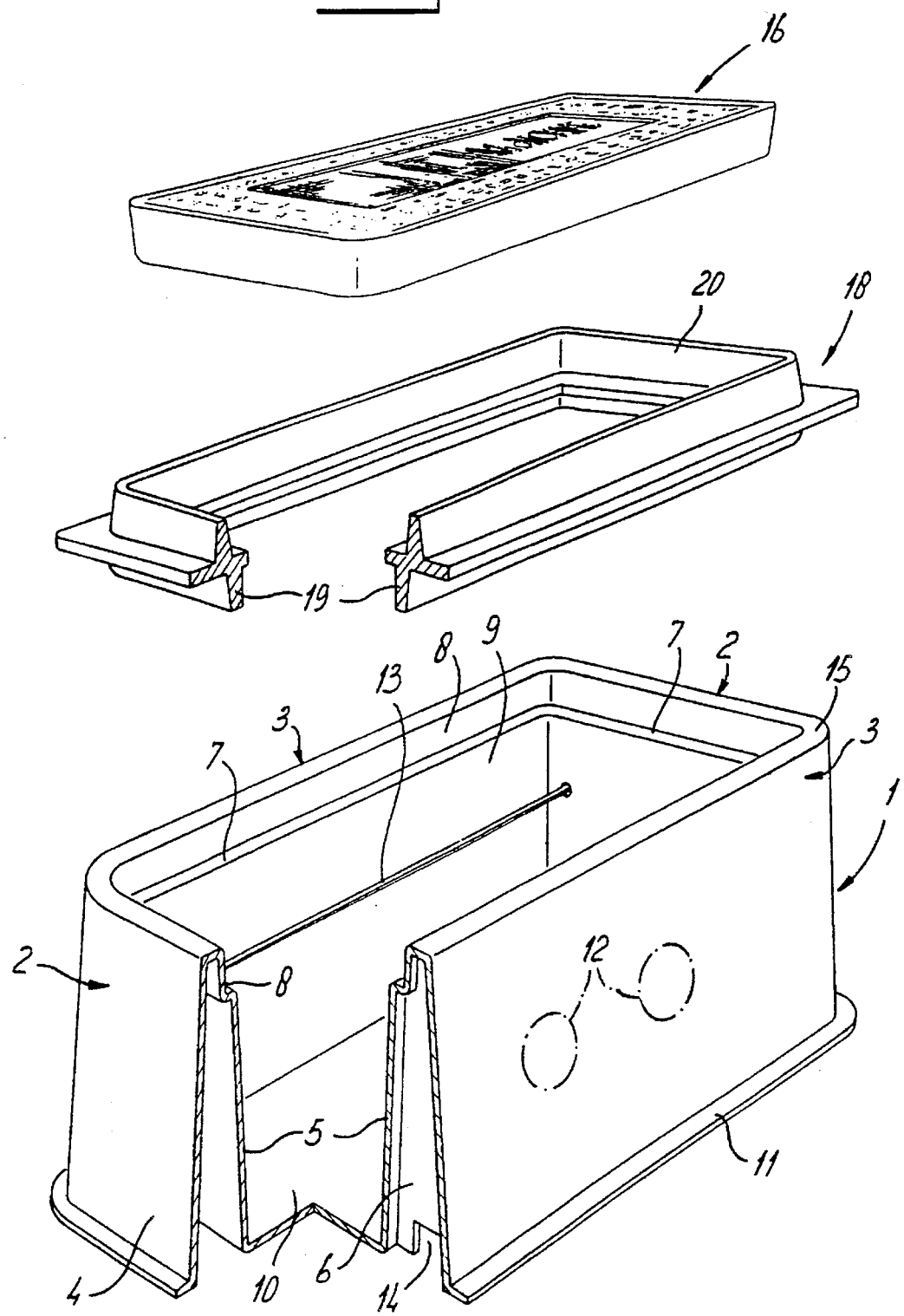

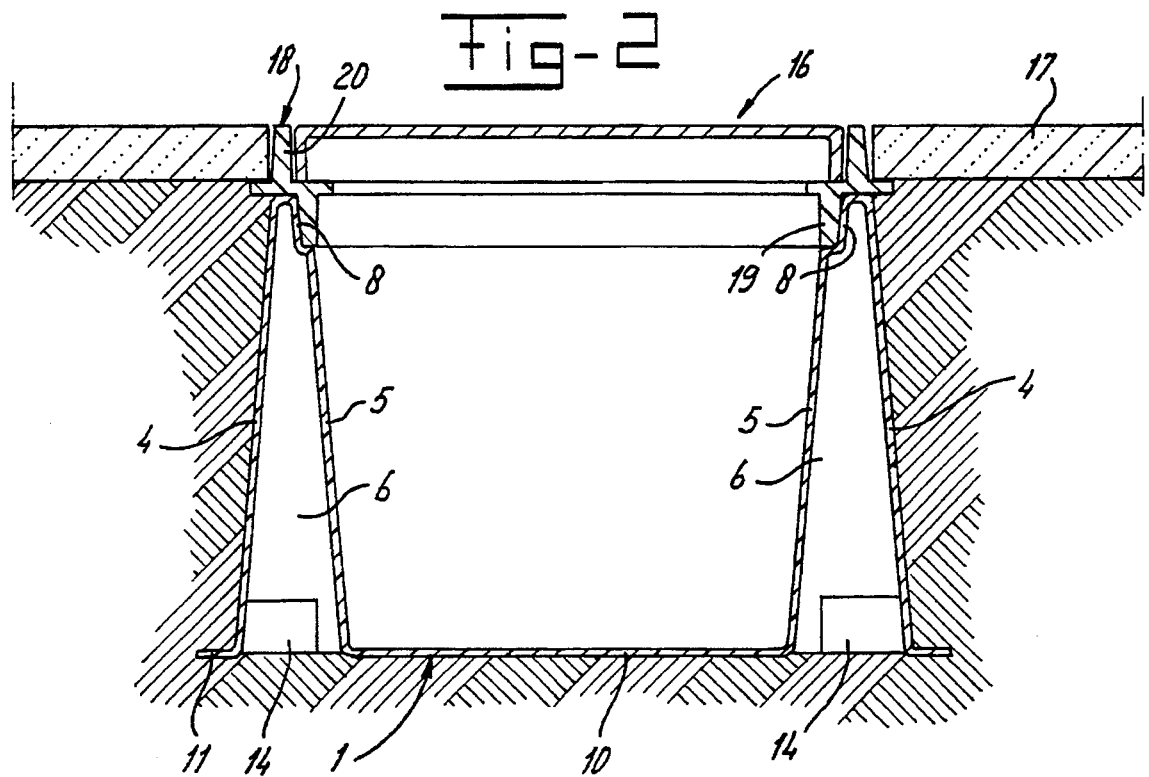
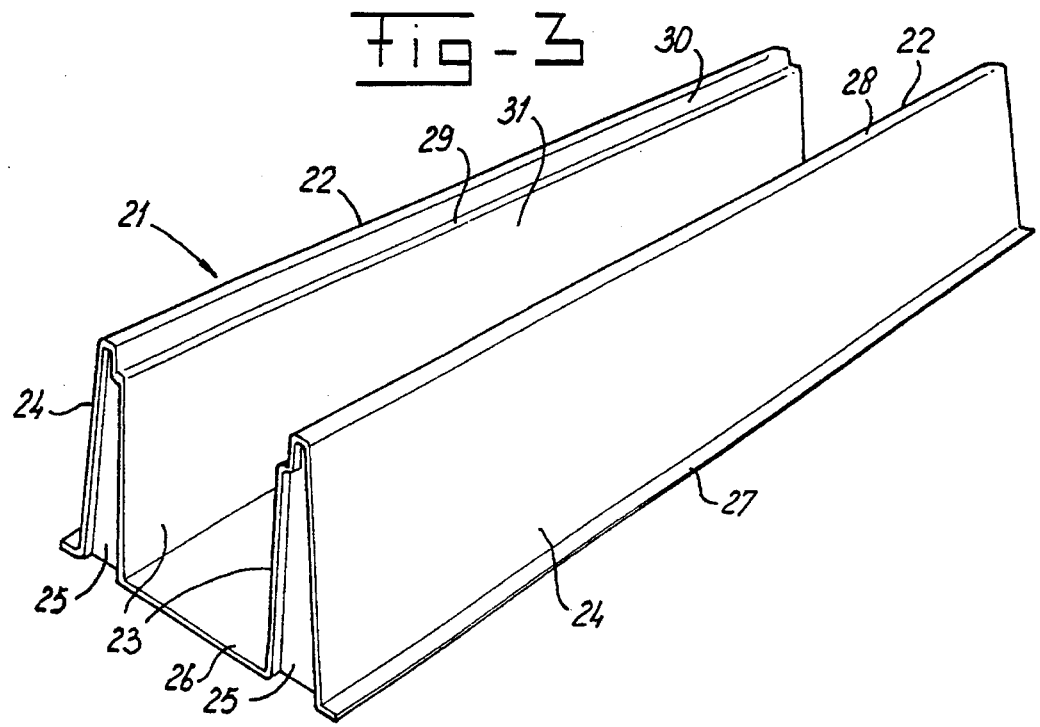

HOUSING DEVICE FOR FITTING IN THE PAVEMENT

The invention relates to a housing device intended for fitting in the pavement of a road surface, footpath and the like, the device opening out on the surface of the pavement, which device comprises sides forming an interior space and bounding an access opening near their top end.

Such housing devices are found in many different forms. We mention as an example connection points for gas and electricity; cable connections, for example for data transmission or television pictures, can also be accommodated in such devices.

In view of the high traffic loads to which such devices are exposed, they are generally made of cast iron. In some cases they are made of concrete. The disadvantage in using such materials is that the devices are heavy and not very flexible in use.

There has therefore already been a switch to the use of plastic materials in this field, which has led to a substantial weight reduction. However, it has been found in practice that such plastic constructions are unable to withstand the loads to which they are exposed. The sides of the device therefore have to be stabilised subsequently, by pouring concrete around the device, which is time-consuming and expensive.

The object of the invention is therefore to provide a device of the type mentioned above which is also sufficiently stable when made of plastic. This object is achieved through the fact that the sides each have an inside wall and an outside wall which are situated a distance apart, which walls of one side in each case are interconnected by ribs.

The walls which are interconnected by ribs give the device great stability, also as regards pressure loads. This means that the plastic construction also has sufficient resistance to high traffic loads. On the other hand, the quantity of material can remain limited, which makes handling easier. A device designed in this way is also extremely easy to manufacture by injection moulding.

The stability can be increased even further if the distance between the walls increases from the top end.

The support in the ground below can be improved if the inside walls are interconnected at their bottom end by a bottom; the outside walls may, if desired, have an outward pointing flange at their bottom end.

As already mentioned, the device according to the invention can be used for different purposes. We mention as a first example an embodiment as a junction box, comprising such a device and also a cover, which device has four sides which together form a square or rectangle, which sides have supporting means for the cover at their top end.

The inside wall of each side can have at its top end an inward displaced area which forms a supporting flange for the cover. In that connection a supporting ring can also be provided, which supporting ring has a positioning ridge which fits into the inward displaced area of the device, and also a supporting ridge into which the cover fits.

According to a preferred embodiment, at least one of the walls is provided with a cable bushing, and supporting means for electrical connection means are provided in the inside of the device.

A second example of a potential application is a gutter element comprising such a device with two opposite-lying longitudinal sides, which device can be connected at two opposite-lying end faces to a further device in each case.

With such a gutter element, elongated gutters can be laid in the pavement, for example of the type found in pedestrian areas. The longitudinal sides in this case have supporting means for a grid at their top end.

The invention will now be explained in greater detail with reference to the drawings.

FIG. 1 shows a dismantled view in perspective, partially in section, of an example of the housing device, in the form of a junction box.

FIG. 2 shows in cross-section the example of FIG. 1, after fitting.

FIG. 3 shows in perspective a second example of the housing device, in the form of a gutter element.

Figure 4:
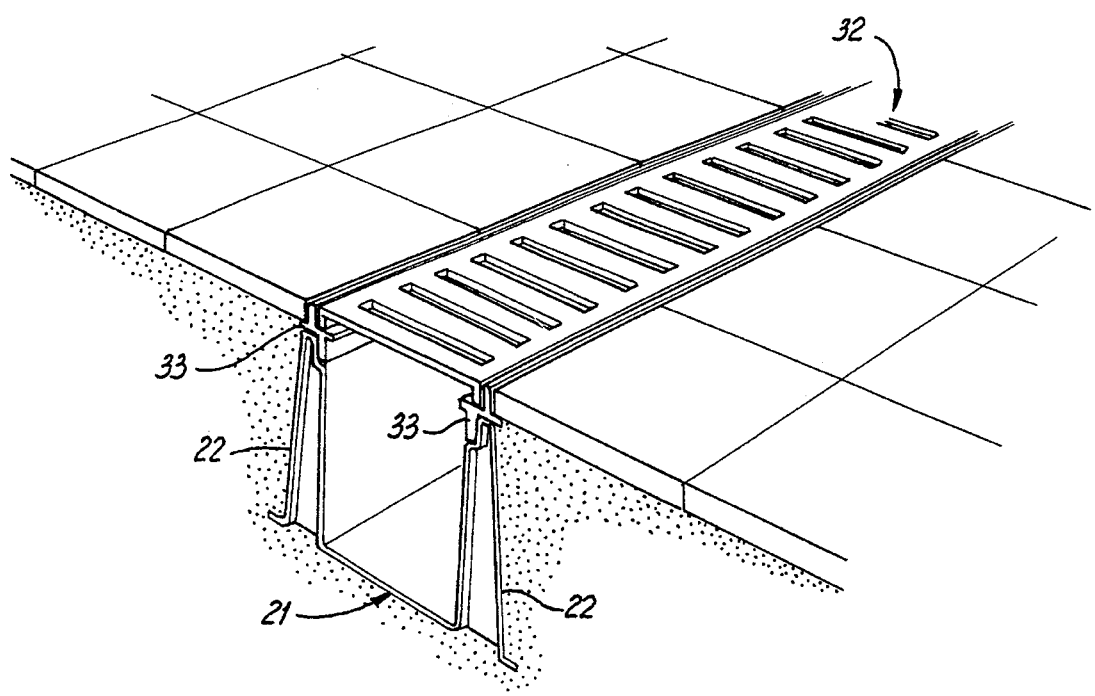
FIG. 4 shows in cross-section and perspective the gutter element shown in FIG. 3, after fitting.

The junction box shown in FIGS. 1 and 2 comprises a housing device 1 which has two short sides 2 and two long sides 3. The sides 2, 3 are each made up of an outside wall 4, an inside wall 5, and ribs 6. The outside walls 4 and inside walls 5 are connected at their top end by a strip 15, while the inside walls 5 are also provided with supporting flanges 7. These supporting flanges form the connection between the top part 8 of each inside wall 5 which is displaced outwards relative to the part 9 of each inside wall 5 lying further down.

Furthermore, the inside walls 5 are fixed to each other at their bottom end by means of bottom 10. The outside walls bear an outward pointing flange 11 running all the way round them.

The housing device 1 shown in FIG. 1 is made in one piece by injection moulding, with the result that a very sturdy and stable construction is ensured.

As shown diagrammatically, the housing device 1 can be provided with cable bushings 12. A suspension strip or suspension bar 13 can also be provided in the inside walls 5 of the short sides 2, from which power points, for example, can be suspended.

The ribs 6 are provided with recesses, in such a way that the housing devices 1 can be stacked on top of each other for transportation purposes. The top end of one housing device 1, in particular the area near strip 15, is nested in the recesses 14 of the ribs 6 in this case.

The housing device 1 is designed to be fitted in such a way that the cover 16 in the end lies in the same plane as the pavement 17. As shown in FIG. 2, a supporting ring 18 can also be provided in this case, which ring has a positioning ridge 19 which fits into the outward displaced area 8 of the inside walls 5. The supporting ring also has a supporting ridge 20, inside which the cover 16 fits.

In the case of a junction box constructed in this way the traffic loads exerted on the cover 16 are transmitted by way of supporting ring 18 to the inside walls 5 and the outside walls 4 of the housing device 1. These inside walls 5 and outside walls 4 are in this case stabilised by the ribs 6, in order to prevent buckling; the housing device 1 is supported in the ground below by means of the outward pointing flange 11 and the bottom 10.

Although in FIG. 1 cover 16 is supported on the housing device 1 by way of supporting ring 18, it is readily possible to place cover 16 directly inside the outward displaced area 8 of the inside walls 5. In this case also, the traffic loads exerted on cover 16 are borne by inside walls 5 and outside walls 4, connected by the ribs 6.

The supporting ring or height-increasing ring 18 can subsequently still be used if the pavement in the end lies higher up due to the laying of, for example, a new coat of asphalt. The supporting ring 18 is then used to bridge the height difference which has occurred.

A gutter element 21 which has only longitudinal sides 22 is shown in the embodiment of FIG. 3. These longitudinal sides each comprise an inside wall 23 and an outside wall 24, interconnected by ribs 25 situated at regular intervals. Inside walls 23 are interconnected at their bottom end by means of bottom 26; outside walls 24 have an outward pointing flange 27.

Inside walls 23 and outside walls 24 are interconnected at their top end by strip 28; inside wall 23 also has a supporting flange 29, which is formed through the fact that the area 30 is displaced outwards relative to the area 31 of the inside walls 23.

A water drainage channel which can be fitted in the pavement, as shown in FIG. 4, can be formed by means of a number of such gutter elements 21. The gutter elements are covered in this case by a grid 32, which can be supported on the longitudinal sides 22 by means of supporting strips 33.

Nevertheless, it is also possible to support grid 32 directly in the outward displaced area 30 of the inside walls 23, in which case the grid rests with its longitudinal sides on the supporting flanges 29.

I claim:

1. In a housing device for fitting in pavement, the device opening out on the surface of the pavement, which device comprises sides forming an interior space and bounding an access opening near their top end, which sides each have an inside wall and an outside wall which are situated a horizontal distance apart; the improvement comprising vertical ribs interconnecting said inside wall with said outside wall.

2. Device according to claim 1, in which the distance between the walls increases from the top end.

3. Device according to claim 1, in which the inside walls are interconnected at their bottom end by a bottom.

4. Device according to claim 1, in which the outside walls have an outward pointing flange at their bottom end.

5. Junction box, comprising a device according to claim 1, and also a cover, which device has four sides which together form a square or rectangle, which sides have supporting means for the cover at their top end.

6. Junction box according to claim 5, in which the inside wall of each side at its top end has an inward displaced area which forms a supporting flange for the cover.

7. Junction box according to claim 6, in which a supporting ring is provided, which supporting ring has a positioning ridge which fits into the inward displaced area of the device, and also has a supporting ridge inside which the cover fits.

8. Junction box according to claim 5, in which at least one of the walls is provided with a cable bushing, and supporting means are provided in the inside of the device for electrical connection means.

9. Device according to claim 1, wherein said ribs extend vertically substantially full length of said walls.

10. Device according to claim 9, in which the ribs are provided near their bottom end with recesses, in which the top end of the sides of another device can be nested.

11. Gutter element, comprising a device according to claim 1, which device has two opposite longitudinal sides and two opposite ends, said ends being adapted to be connected to further said devices.

12. Element according to claim 11, in which the longitudinal sides have supporting means for a grid at their top end.

13. Element according to claim 12, in which the inside walls of the longitudinal sides each have an inward displaced area which forms a supporting flange for the grid.

\* \* \* \* \*